United States Patent [19]

Gunter

[11] 4,312,122

[45] Jan. 26, 1982

[54] APPARATUS AND METHOD FOR FORMING AN ELECTRICAL SWITCH ASSEMBLY

[75] Inventor: James C. Gunter, Greensburg, Pa.

[73] Assignee: Robertshaw Controls Company, Richmond, Va.

[21] Appl. No.: 64,724

[22] Filed: Aug. 8, 1979

[51] Int. Cl.$^3$ ...................... H01H 11/00; B23P 11/00

[52] U.S. Cl. .................................... 29/622; 29/243.5; 29/432.1; 29/465; 72/356

[58] Field of Search ................. 29/33 M, 33 K, 243.5, 29/417, 432.1, 445, 455 LM, 465, 469, 509, 522, 525, 526 R, 566.1, 566.2, 566.3, 564.1, 564.2, 622, 715, 717, 718; 72/356; 113/116 FF

[56] References Cited

U.S. PATENT DOCUMENTS

| | | | |
|---|---|---|---|
| 3,015,878 | 1/1962 | Hutt | 29/622 X |
| 3,229,357 | 1/1966 | Burstin | 29/622 X |
| 3,263,306 | 8/1966 | Chapin et al. | 29/622 |
| 3,344,250 | 9/1967 | Duval | 29/877 |
| 3,771,480 | 11/1973 | Johnson | 29/509 X |
| 3,900,937 | 8/1975 | Schleicher | 29/522 X |
| 3,967,369 | 7/1976 | Takano | 29/622 |
| 4,035,901 | 7/1977 | Lux et al. | |
| 4,059,897 | 11/1977 | Marquis | |

*Primary Examiner*—Francis S. Husar
*Assistant Examiner*—C. J. Arbes
*Attorney, Agent, or Firm*—Candor, Candor & Tassone

[57] ABSTRACT

An apparatus and method for forming an electrical switch assembly by lancing and forming a part of a terminal member through an unblanked part of an L-shaped switch blade member and thereafter staking the lanced and formed part of the terminal member to an adjacent surface of the switch blade member to secure the members together in abutting relation, the apparatus and method having a single reciprocating head that performs the lancing and forming step on a first stroke thereof and performs the staking step on a second stroke thereof. The head reciprocates substantially vertically beneath the abutting members, the head having a top portion for receiving one leg of the L-shaped switch blade and having a side against which the other leg is disposed. The method and apparatus has an arm for holding the other leg of the switch blade against the side of the head.

20 Claims, 17 Drawing Figures

APPARATUS AND METHOD FOR FORMING AN ELECTRICAL SWITCH ASSEMBLY

BACKGROUND OF THE INVENTION

1. Field of the Invention

This invention relates to an improved apparatus and method for forming electrical switch assemblies in an automatic manner as well as to an improved apparatus and method for lancing and staking two metal parts or the like together.

2. Prior Art Statement

It is known to lance and form a part of an electrical terminal member through an unblanked part of an end of a switch blade member and thereafter stake that part of the terminal member to the other side of the switch blade member to secure the members together to provide an electrical switch assembly for an electrical switch construction or the like.

For example, see the following item:

(1) U.S. Pat. No. 4,059,897—Marquis

It is also known to provide a lancing and staking apparatus and method for forming such an electrical switch assembly, the apparatus having a single reciprocating head provided with a first section that performs the lancing and forming step on a first stroke of the head and provided with a second section that forms the staking step on a second stroke thereof.

For example, see the following item:

(2) U.S. Pat. No. 4,035,901—Lux et al

SUMMARY OF THE INVENTION

It is a feature of this invention to provide an improved method and apparatus for automatically forming electrical switch assemblies each of which comprises a terminal member and a switch blade secured together at a station in the apparatus.

In particular, it was found that the piece part operator fed lancing and staking apparatus of the aforementioned U.S. patent to Lux et al, U.S. Pat. No. 4,035,901, was limited in the number of completed electrical switch assemblies that could be made by the same during each hour of operation of that apparatus.

In addition, it was found that if the switch blade of each electrical switch assembly had a particular bend therein because of the particular switch application thereof, it was difficult to piece part load the lancing and staking apparatus of the aforementioned U.S. Pat. No. 4,035,901, to Lux et al.

Therefore, it was found, according to the teaching of this invention, that the apparatus of the aforementioned U.S. Pat. No. 4,035,901, to Lux et al, could be turned upside down to have the reciprocating head thereof operate substantially vertically beneath the parts to be assembled thereby, rather than operate vertically above the parts as in the patent to Lux et al, U.S. Pat. No. 4,035,901, whereby the particularly shaped switch blades could each be better operator fed into the apparatus to be lanced and staked thereby to its associated terminal member.

It was also found according to the teachings of this invention that such inverted prior known lancing and staking apparatus would lend itself to permitting an automatic feeding of the switch blades and terminals thereto to be lanced and staked together in a manner hereinafter set forth.

In order to provide for such automatic feeding, it was further found according to the teachings of this invention, that the switch blades could be uniquely formed from a strip of switch blade material and remain interconnected together in strip form to be fed through the lancing and staking apparatus to have the terminals serially lanced and staked thereto so that the strip of material could subsequently have the individual switch assemblies separated therefrom and at the same time have a further forming operation performed thereon as will be apparent hereinafter.

In particular, one embodiment of this invention provides an apparatus for forming electrical switch assemblies each of which comprises a terminal member and a switch blade secured together at a station in the apparatus, the apparatus having a first feeding means for feeding an elongated strip of switch blade material to the station. The apparatus has forming means for forming the strip of switch blade material into a plurality of switch blades serially interconnected together upstream from the station, the apparatus having a second feeding means for serially feeding terminal members to the station. The apparatus has securing means for securing a terminal member and its respective switch blade together at the station, the apparatus having separating means for serially separating each switch assembly of the strip of material downstream from the aforementioned station.

The securing means of such apparatus can comprise the lancing and staking apparatus of the aforementioned U.S. Pat. No. 4,035,901 to Lux et al, except that the same has been uniquely inverted according to the teachings of this invention to thereby provide an improved method and apparatus for lancing and staking two metal parts or the like together.

In particular, another embodiment of this invention comprises an apparatus for joining two abutting metal members together by lancing and forming a part of one member through an unblanked part of the other member and thereafter staking the lanced and formed part of the one member to an adjacent surface of the other member to secure the members together in abutting relation, the apparatus having a single reciprocating head provided with a first means that performs the lancing and forming step and a second means that performs the staking step on a second stroke thereof. Such an apparatus is arranged so that the head thereof reciprocates substantially vertically beneath the abutting metal members.

The first means of the head comprises a female die member. The apparatus has a punch toward which the head is moved during the first stroke thereof to lance and form the metal members between the female die and the punch. The second means of the head comprises an anvil member adapted to reciprocate in the female die member, the anvil member being adapted to compact the lanced and formed parts of the metal members between the anvil member and the punch during the second stroke of the head to perform the staking step. The one member comprises an electrical terminal and the other member comprises a switch blade whereby the secured together members comprise a switch blade assembly, the switch blade being substantially L-shaped and thereby having two legs disposed substantially at a right angle relative to each other with the terminal member to be secured to one of the legs. The head has a top means for receiving the one leg of the switch blade thereon and has a side means against which the other of the legs of the switch blade can be disposed. The apparatus has arm means for holding the other leg of the switch blade against the side means of the head.

Accordingly, it is an object of this invention to provide an improved apparatus for forming electrical switch assemblies or the like, the apparatus of this invention having one or more of the novel features of this invention as set forth above or hereinafter shown or described.

Another object of this invention is to provide an improved method for forming electrical switch assemblies or the like, the method of this invention having one or more of the novel features of this invention as set forth above or hereinafter shown or described.

Another object of this invention is to provide an improved apparatus for joining two abutting metal members or the like together, the apparatus of this invention having one or more of the novel features of this invention as set forth above or hereinafter shown or described.

Another object of this invention is to provide an improved method for joining two abutting metal members or the like together, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

DESCRIPTION OF THE PREFERRED EMBODIMENTS

Figure 1:
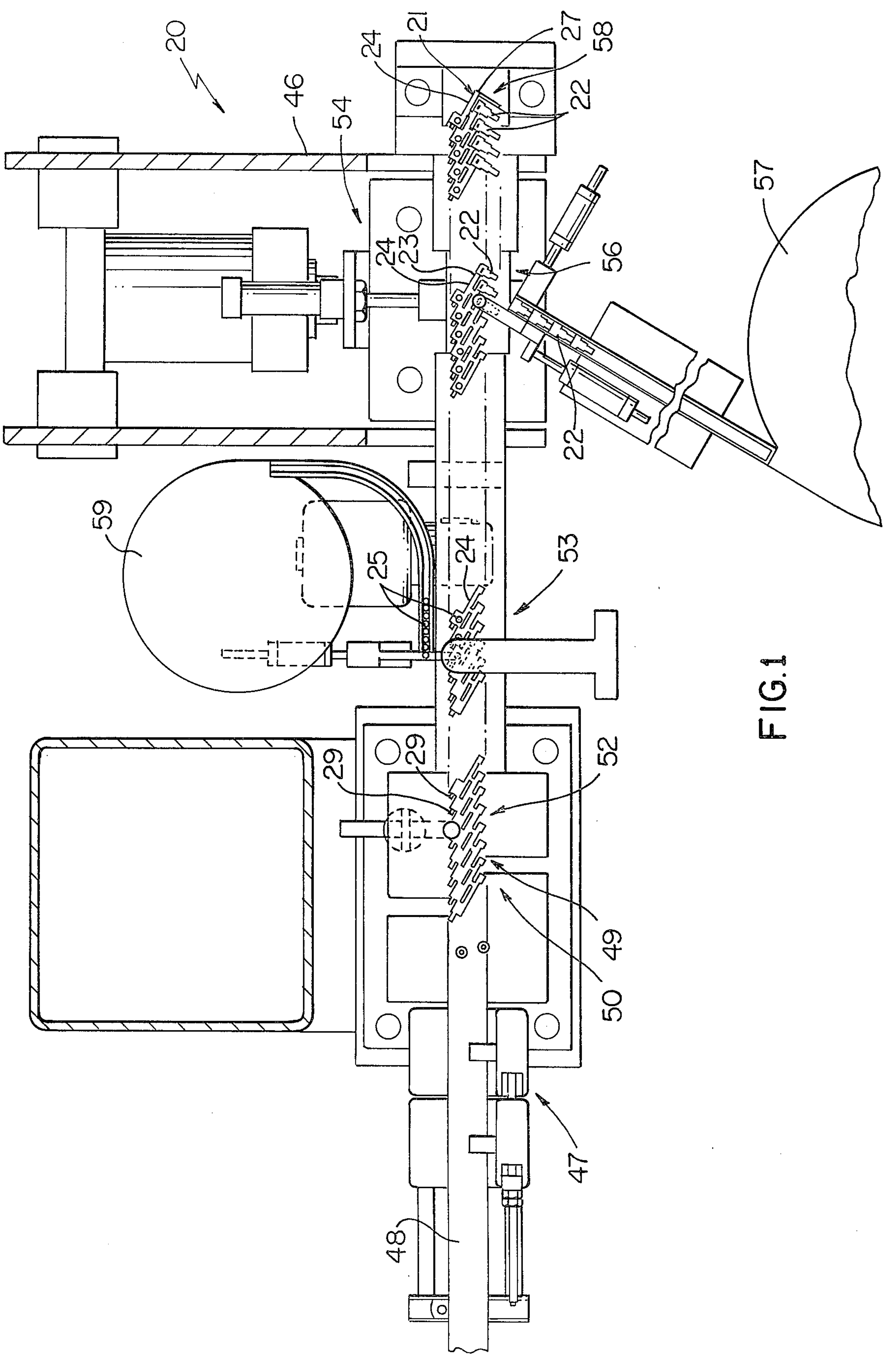
FIG. 1 is a schematic view illustrating one embodiment of the improved method and apparatus of this invention.

While the various features of this invention are hereinafter described and illustrated as being particularly adapted to provide a means for forming an electrical switch assembly, it is to be understood that the various features of this invention can be utilized singularly or in any combination thereof to provide a securing means for other devices as desired.

Therefore, this invention is not to be limited to only the embodiments illustrated in the drawings, because the drawings are merely utilized to illustrate one of the wide variety of uses of this invention.

Figure 2:
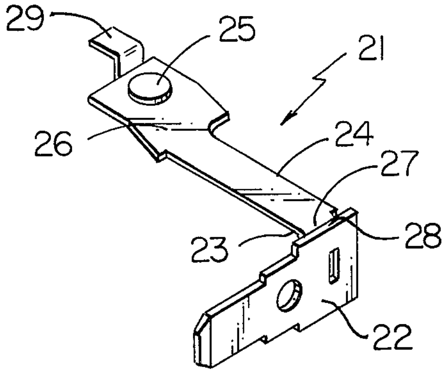
FIG. 2 is an enlarged perspective view illustrating the switch assembly that is made by the method and apparatus of FIG. 1.

Referring now to FIG. 1, the improved method and apparatus of this invention is generally indicated by the reference numeral 20 and is utilized to automatically form a plurality of electrical switch assemblies each of which is generally indicated by the referencd numeral 21 in FIG. 2 and comprises a relatively thick metal terminal member 22 secured to one end 23 of a relatively thin metal electrical switch blade 24 carrying electrical contact means 25 on the other end 26 thereof whereby the end 26 of the switch blade 24 is adapted to be carried in cantilevered fashion by the terminal member 22 to perform a contact switching function in a manner well known in the art.

The end or arm 23 of the switch blade 24 is bent at a right angle relative to the end or arm 26 thereof so as to define a bend or elbow 27 immediately adjacent a side 28 of the terminal member 22 that is secured thereto in order to properly position the terminal member 22 and switch blade 24 for a particular switch construction application thereof.

The end or arm 26 of the switch blade 24 is provided with a bent tang 29 at the free end thereof.

As will be fully explained hereinafter, the method and apparatus 20 of this invention secures the terminal member 22 to the switch blade 24 by a lancing and staking operation in a unique and automatic manner that will be fully appreciated after a discussion has been made of an improved lancing and staking method and apparatus of this invention that is generally indicated by the reference numeral 30 in FIGS. 15-17.

In particular, not only was it well known to applicant to lance and stake an electrical terminal member and a switch blade member together as set forth in the aforementioned U.S. Pat. No. 4,059,897, to Marquis, but it was also known to applicant that an apparatus had been provided for performing such lancing and staking operation to form that switch blade assembly as is evidenced by the aforementioned U.S. Pat. No. 4,035,901, to Lux et al.

However, in the particular switch blade assembly 21 of this invention, the switch blade 24 was initially formed with the bend 27 thereof so that the switch blade 24 was in an L-shape before the terminal member 22 was secured thereto by a pair of rivets in a manner that is well known.

However, when applicant attempted to modify the punch structure of the apparatus of the aforementioned patent to Lux et al, No. 4,035,901, to accept the L-shaped formed switch blade 24 therein, various complications were encountered.

Therefore, applicant uniquely repositioned the Lux et al apparatus so as to permit an operator to hand feed the previously bent switch blades 24 and the associated terminal members 22 therein to be lanced and staked together. Such unique repositioning comprised an unexpected decision to completely invert the Lux et al apparatus 180° so that the reciprocating head thereof would become the load receiving portion thereof for the parts to be lanced and staked thereby. This repositioning of the Lux et al apparatus required further modification thereto to assure that the parts would remain on the reciprocating head during the initial forming stroke thereof and this problem was solved in a manner hereinafter set forth.

Figure 15:
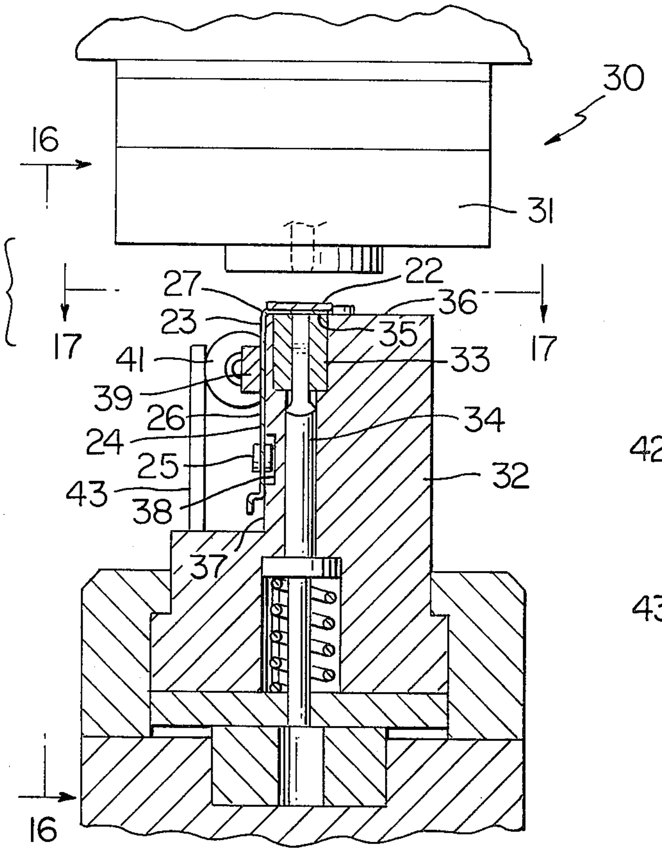
FIG. 15 is a view similar to FIG. 8 and illustrates another embodiment of the lancing and staking apparatus of this invention.
Figure 16:
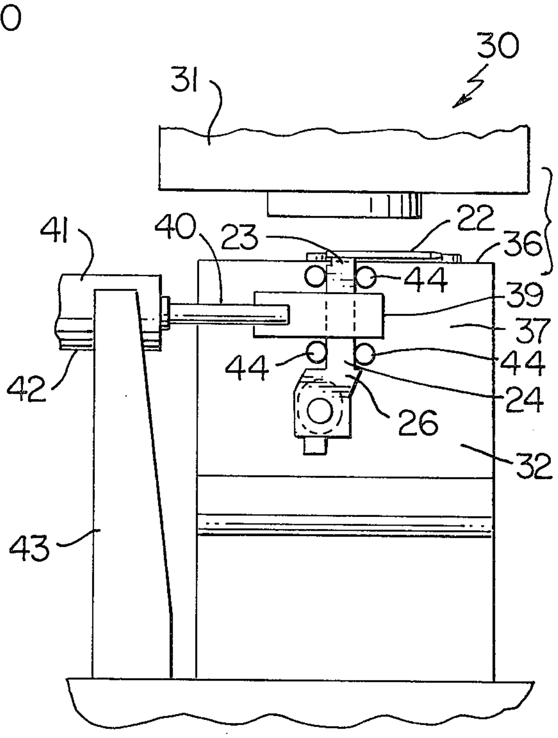
FIG. 16 is a front view of the lancing and staking apparatus of FIG. 15 and is taken in the direction of the arrows 16—16 thereof.
Figure 17:
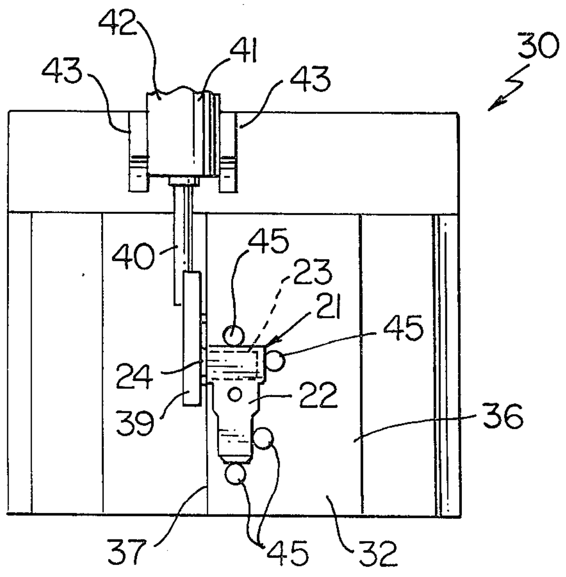
FIG. 17 is a fragmentary view of the apparatus illustrated in FIG. 15 and is taken in the direction of the arrows 17—17 thereof.

Therefore, it is to be understood that the apparatus and method 30 illustrated in FIGS. 15–17 is identical to the structure and operation of the apparatus fully disclosed and claimed in the aforementioned U.S. Pat. No. 4,035,901, to Lux et al, and such patent to Lux et al is incorporated in its entirely by reference into this disclosure to teach the particular structure for operating the reciprocating head thereof as well as for operating the stripping punch thereof so that a discussion of the operation and a showing of the detailed structure thereof need not be made in this application.

However, sufficient details of the structure and operation of the lancing and staking apparatus of the patent to Lux et al, U.S. Pat. No. 4,035,901 will be described in this application in order to fully understand the improved features of this invention.

As illustrated in FIGS. 15 and 16, the apparatus 30 includes a stationary punch means 31 and a reciprocating head 32 provided with a female die means 33 that cooperates with the stationary punch 31 during a first stroke of the head 32 against the stationary punch 31 to lance a part of the terminal member 22 through an unblanked portion of the abutting leg 23 of a switch blade member 24 and thereafter, on a second stroke of the head 32 toward the stationary punch 31, an anvil means 34 of the head 32 performs the step of staking the lanced and formed part of the terminal part 22 to the opposed surface 35 of the leg 23 of the switch blade member 24 to secure the same together in a manner more fully described in connection with the automatic apparatus 20 of this invention.

It was found that in order to have the reciprocating head 32 receive the parts 22 and 24 thereon, the top surface 36 and side surface 37 of the head 32 needed to be modified from the structure set forth in the aforementioned U.S. Pat. No. 4,035,901, to Lux et al, to permit the leg 26 of the switch blade 24 to be positioned at a right angle to the leg 23 thereof and with the contact means 25 being received in a suitable recess means 38 formed in the side surface 37 as illustrated.

Also, a reciprocating holding arm 39 is attached to the head 32 of the apparatus 30 by being mounted on a piston 40 of a piston and cylinder device 41 having the cylinder 42 thereof supported by a frame means 43 to the head 32 so that the piston 40 can be extended to move the arm 39 over the leg 26 of the initially positioned switch blade 24 so that during the reciprocating movement of the head 32 toward the stationary punch means 31, the switch blade 24 will remain on the moving head 32. Of course, once the terminal member 22 has been lanced and staked to the switch blade 24 to form the electrical assembly 21, the piston 40 is retracted into the cylinder 42 whereby the arm 39 is moved away from the switch blade 24 and the assembly 21 can be removed from the apparatus 30 manually or automatically, such as with a jet of air or the like.

The side surface 37 of the movable head 32 is also provided with a plurality of locating pins or members 44 so that the leg 26 of the switch blade 24 will be properly positioned against the side surface 37 of the head 32 and such positioning of the leg 26 causes the leg 23 thereof to be properly positioned on the top surface 36 of the movable head 32 for the lancing and staking operation.

The top surface 36 of the movable head 32 is also provided with a plurality of locating pins or abutments 45 as illustrated in FIG. 17 so that after the switch blade 24 has been positioned on the movable head 32, the terminal member 22 is positioned on top of the same at the top surface 36 as illustrated in FIG. 17 so that subsequent operation of the lancing and staking apparatus 30 will perform the lancing and staking steps previously described to fasten the switch blade 24 and terminal member 22 together to form the switch assembly 21 as illustrated in FIG. 2.

Therefore, it can be seen that the lancing and staking apparatus of the aforementioned U.S. Pat. No. 4,035,901, to Lux et al, can be modified according to the teachings of the invention by inverting the same 180° so that the reciprocating head 32 thereof is disposed beneath the parts 22 and 24 that are to be lanced and staked together and the reciprocating head 32 can be modified in the side and top surfaces 37 and 36 thereof and be provided with the holding arm means 39 to operate in a manner now to be described to lance and stake together a pre-bent switch blade 24 and its respective terminal member 22.

Assuming that the arm 39 is retracted to the left in FIG. 16 so that the operator can position the switch blade 24 against the side surface 37 by having the leg 26 positioned between the locating pins 44 in the position illustrated in FIG. 16, the operator then assembles the terminal member 22 as properly positioned by the locating pins 45 as illustrated in FIG. 17.

Figure 12:
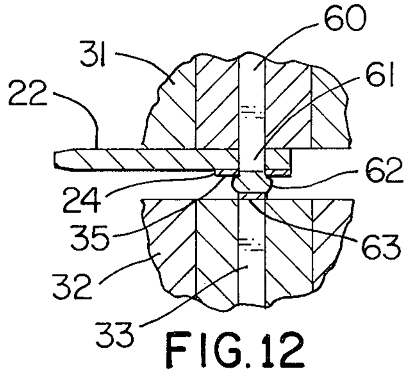
FIG. 12 is an enlarged fragmentary cross-sectional view taken on line 14—14 of FIG. 11.
Figure 14:
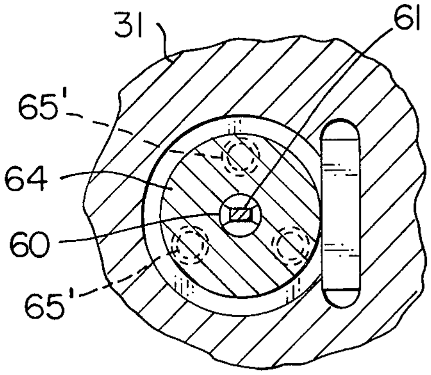
FIG. 14 is a fragmentary cross-sectional view taken in line 14—14 of FIG. 11.

Thereafter, the operator initiated the actuation of the apparatus 30 so that the reciprocating head 32 on the first upward stroke thereof cooperates with the punch means 31 to lance and form a part of the terminal member 22 through an unblanked part of the leg 23 of the switch blade 24 and thereafter performs a second reciprocating stroke upwardly to cause the anvil means 34 to cooperate with the punch means 31 to stake the formed part of the terminal member against the side 35 of the leg 23 to stake the parts 22 and 24 together in the manner illustrated in FIG. 12, the arm 39 having been moved over the leg 26 of the switch member 24 at the time the head 32 is to begin the first stroke thereof and is then retracted from the leg 24 after the head 22 performs its second stroke and is returned to the position illustrated in FIG. 16. At this time, the completed assembly of the switch blade member 24 and terminal 22 can be removed from the apparatus 30 and the apparatus 30 can be provided with new parts to again perform the lancing and staking function previously described.

Therefore, it can be seen that the method and apparatus of this invention can be utilized to lance and stake together the two metal members 22 and 24 by utilizing the aforementioned modifications of the method and apparatus disclosed and claimed in the aforementioned U.S. Pat. No. 4,035,901 to Lux et al.

However, it was further found by applicant that the lancing and staking apparatus 30 required too many steps by the operator thereof to turn out a sufficient number of assemblies 21 per hour of operation of the apparatus 30.

Therefore, applicant conceived the idea of automating the improved method and apparatus 30 and in conceiving such automated arrangement, realized that while it is still desirable to have the head 22 reciprocate beneath the parts to be lanced and staked thereby, the switch blade 24 could be in an initial flat form and the bending thereof could take place after the terminal 22 has been lanced and staked thereto.

Accordingly, while an actual apparatus as depicted in FIG. 1 has not been built, it is believed that engineering wise, such unique apparatus 20 can be formed and built to function and operate in a manner hereinafter set forth.

Figure 3:
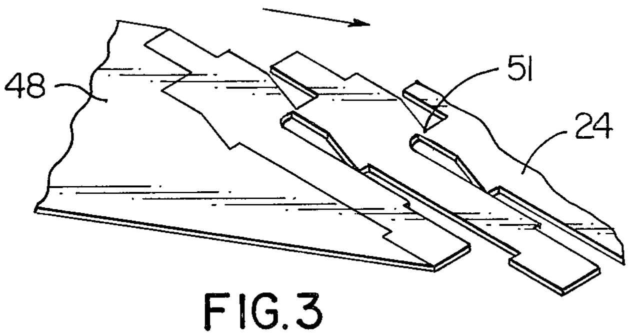
FIGS. 3-7 are respectively fragmentary perspective views illustrating the various steps in the operation of the method and apparatus of FIG. 1 that acts on a strip of switch blade material thereof to form the completed switch assembly of FIG. 2.

The apparatus and method 20 of this invention comprises a frame means 46 that has a first feeding means 47 for feeding a strip of switch blade making material 48 from a supply roll thereof (not shown) through the apparatus 20 from left to right in FIG. 1 in incremental steps so that as the strip of material 48 is progressed through the apparatus, a forming and cutting unit 49 forms the strip 48 into a plurality of switch blades 24 in a first unit 50 thereof with the switch blades 24 remaining interconnected together by unsevered portions 51 thereof as illustrated in FIG. 3 so that the interconnected switch blades 24 will move in strip form through the apparatus in the manner hereinafter set forth. The forming means 50 forms the switch blades 24 to be disposed at the angle illustrated in FIG. 1 relative to the straight line movement of the strip of material 48 through the apparatus 20 for a purpose hereinafter described.

Figure 4:
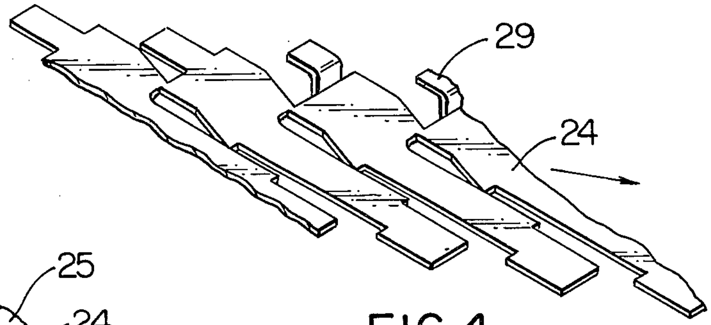

A second unit 52 of the forming means 49 is adapted to form the bent tab 29 for each switch blade 24 as the strip 48 progresses through the apparatus 20 as illustrated in FIG. 4.

Figure 5:
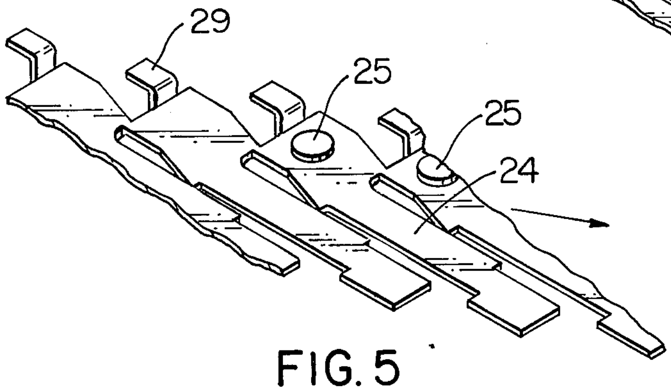

Subsequently, the strip of material 48 passes through a contact securing unit means 53 which secures the contact means 25 to the leg 24 of each switch blade 24, whether on the top side thereof, the bottom side thereof, or both sides as desired, so that when the strip of material 48 moves further to the right from the contact securing station 53, the same has all the necessary contact means thereon as illustrated in FIG. 5.

The contacts 25 are fed to the contact securing means 53 by a feeding means 59 as illustrated in FIG. 1.

Subsequently, the strip of material 48 is advanced to the lancing and staking apparatus that is generally indicated by the reference numeral 54 in FIG. 1 and is of the type previously described in connection with FIGS. 15–17 except that the reciprocating head 32 thereof does not have the side 37 cut away to accept a bent switch blade 24. Thus, the lancing and staking apparatus 54 for the apparatus 20 will be described with the same reference numerals utilized for the lancing and staking apparatus 30 when appropriate.

Figure 8:
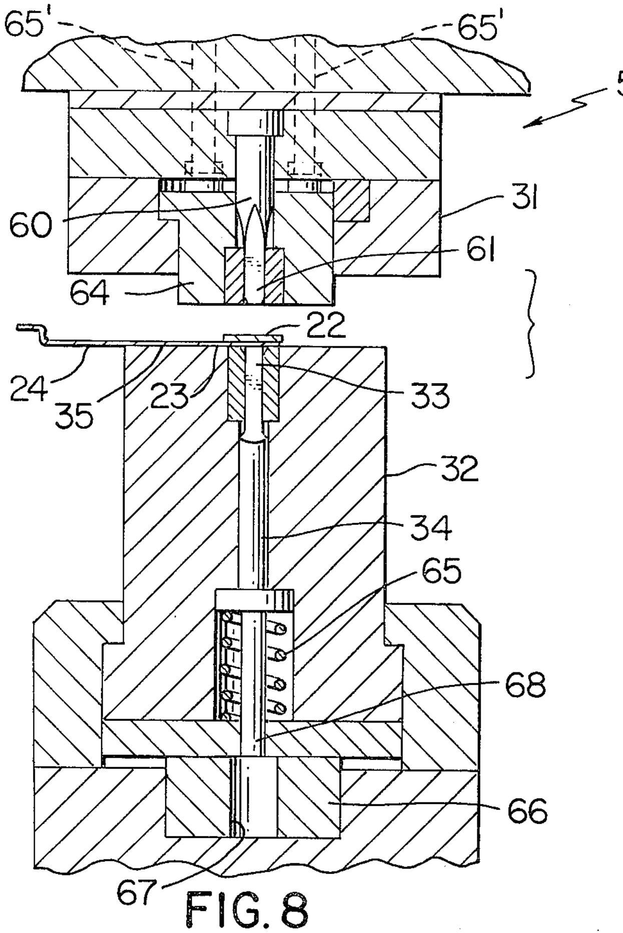
FIG. 8 is a fragmentary cross-sectional view illustrating the lancing and staking apparatus portion of the method and apparatus of FIG. 1, FIG. 8 illustrating the lancing and staking apparatus after the same has initially received a switch blade and a terminal member therein.

Accordingly, it can be seen that the lancing and staking apparatus 54 in the automatic apparatus 20 is disposed at a station 56 of the apparatus 20 wherein the switch blade strip 48 is indexed onto the top surface 36 of the reciprocal head 32 in the manner illustrated in FIG. 8 and a feeding means 57 of the apparatus 20 serially feeds the terminal members 22 to the station 56 to position a terminal member 22 on top of the end 23 of the switch blade 24 in the manner illustrated in FIG. 8 and at an angle to the direction of movement of the strip 48 so that the terminal member 22 is disposed in substantially a right angle to its respective blade 24 as illustrated in FIG. 1.

Figure 6:
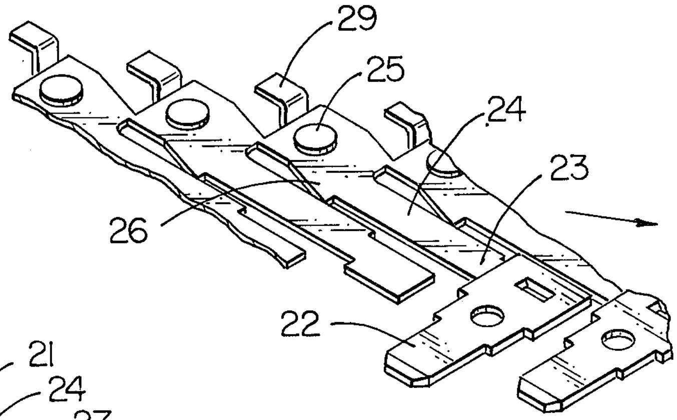
Figure 7:
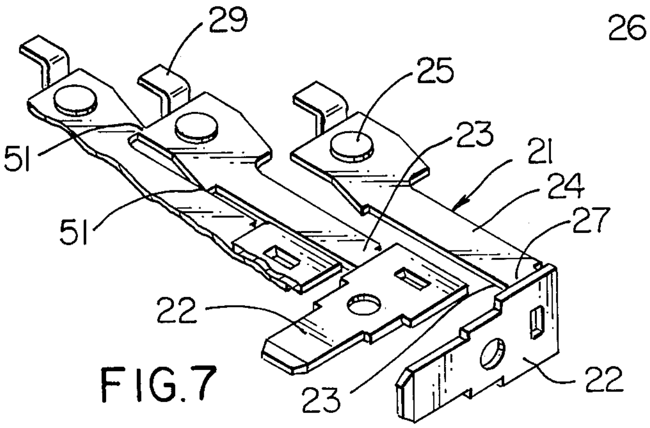

After the terminal member 22 has been lanced and staked to the particular switch blade 24 at the station 56 by the apparatus 54 as illustrated in FIG. 6, the strip 48 is further indexed to the right in FIG. 1 so that the interconnected switch blades 24 and terminal members 22 are advanced to a forming unit 58 that not only serially cuts each assembly 21 from the strip 48 by severing the interconnecting section 51 thereof, but also such forming and cutting unit 58 bends the switch blade 24 to form the elbow 27 thereof and thereby forms the assembly 21 into the final configuration as illustrated in FIG. 2 and in FIG. 7. Thus, it can be seen that the unit 58 has a separating means that separates each assembly 21 from the strip 48 and also has bending means for serially bending each assembly 21 while separating the same from the strip 48.

If desired, such forming unit 58 could also bend and form the tab 29 for each assembly 21 rather than have said tab 29 formed by the unit 52 as previously described.

Thus, it can be seen that it is believed that the apparatus 20 can, in an automatic manner, feed the unblanked strip of switch blade making material 48 therethrough to have the forming means 49 form the strip into a plurality of interconnected blades to subsequently have the terminal members 22 serially lanced and staked thereto at the station 56 by the lancing and staking apparatus 54 of this invention and, if desired, have the contact means 25 secured thereto in advance of the station 56 while the forming unit 58 downstream from the lancing and staking station 56 cuts the individual assemblies 21 from the strip of material 48 and at the same time forms the switch blade 24 into its L-shape for a particular switch construction application thereof.

The strip of material 48 can comprise brass strip stock approximately 1¼ inch wide and approximately 0.01 of an inch thick although it is to be understood that any suitable switch blade forming stock could be utilized as desired.

Therefore, it can be seen that the automatic apparatus 20 of this invention uniquely maintains the switch blades 24 in interconnected condition so that the same can be indexed to the lancing and staking apparatus 54 whereby the lancing and staking apparatus 54 will be adapted to lance and stake the terminals 22 thereto in a believed to be more rapid rate than the manually loaded operation of the apparatus 30 of FIGS. 15–17 previously described.

The particular details of the lancing and staking operation at the station 56 of the apparatus 20 will now be described.

As illustrated in FIG. 8, the punch means 31 includes a stationary punch member 60 that has an end 61 formed for cooperation with the female die 33 of the reciprocating head 32 to punch through and lance a part 62, FIG. 12, of the respective terminal 22 through an unblanked part 63 of the switch blade 24 so that the part 62 of the terminal 22 extends beyond the side 35 of the switch blade 24 to be subsequently staked thereagainst in the manner illustrated in FIG. 12.

Figure 10:
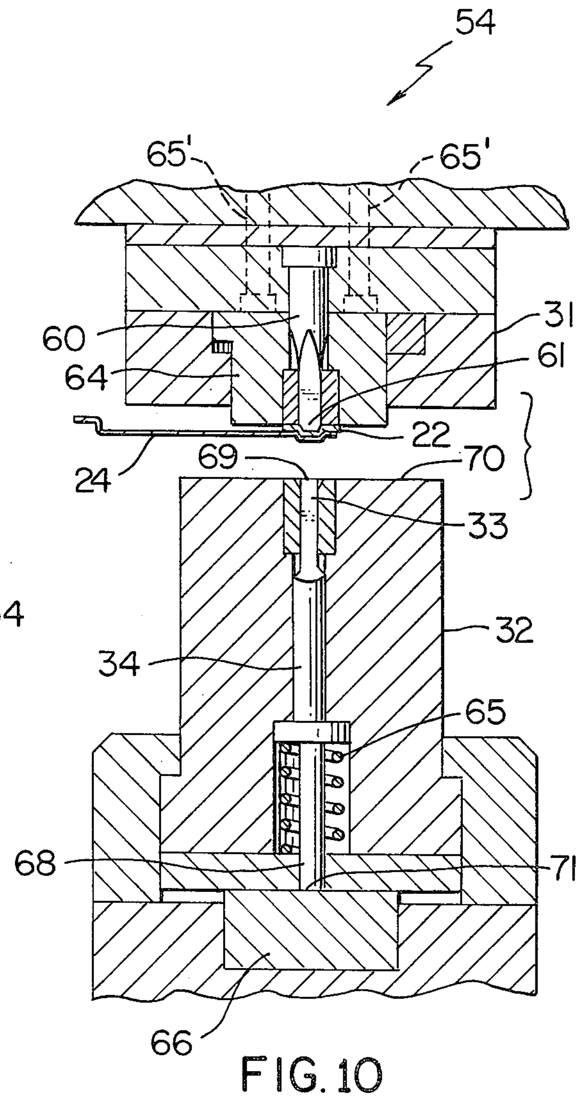
FIG. 10 is a view similar to FIG. 9 and illustrates the position of the lancing and staking apparatus intermediate the lancing and forming operation of FIG. 9 and the staking operation of FIG. 11.
Figure 13:
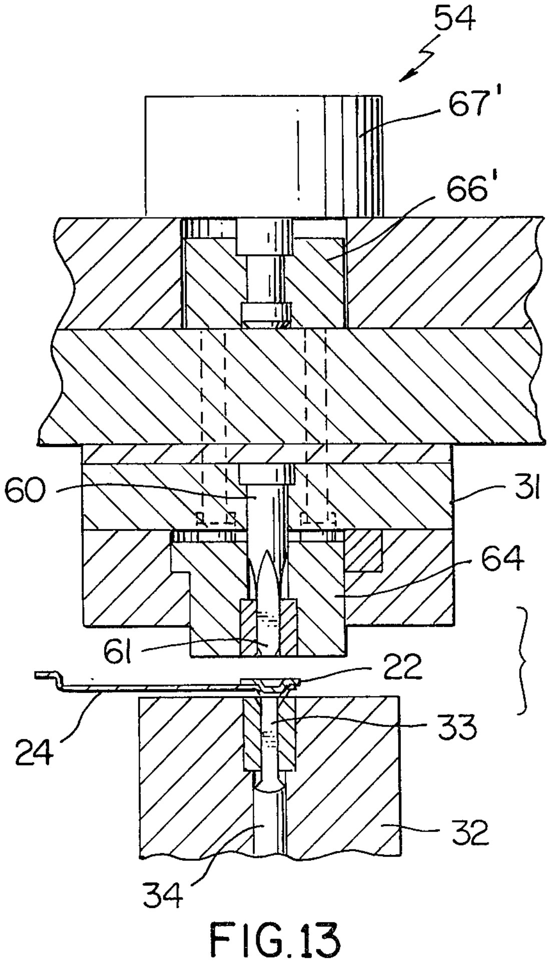
FIG. 13 is a view similar to FIG. 11 and illustrates the lancing and staking apparatus performing its stripping operation.

A movable annular stripper member 64 surrounds the punch 60 and is movable between the position illustrated in FIG. 8 and the position illustrated in FIG. 10, the stripper 64 being carried on a plurality of pins 65' attached to a piston member 66' of a piston and cylinder means 67' illustrated in FIG. 13.

Figure 9:
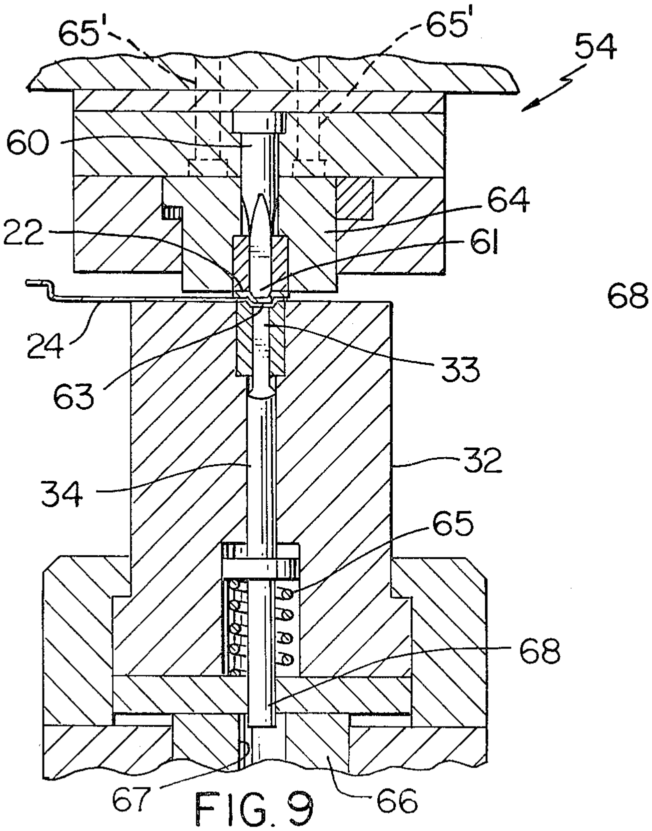
FIG. 9 is a view similar to FIG. 8 and illustrates the lancing and staking apparatus performing its lancing and forming operation.

Thus, when the reciprocating head 32 is first moved upwardly on the first stroke of the head 32 from the position illustrated in FIG. 8 to the position illustrated in FIG. 9, such upward movement of the head 32 carries the switch blade 24 and terminal 22 therewith to cooperate with the punch end 61 as illustrated in FIG. 9 to punch or lance the part 62 of the terminal member 22 through the unblanked portion 63 of the switch blade 24 as the punch end 61 cooperates with the female die means 33 and the stripper 64 is moved upwardly in the manner illustrated in FIG. 9 to permit such action.

Similarly, the anvil member 34 carried by the head 32 is moved downwardly in opposition to the force of the compression spring 65 to permit such lancing operation. In particular, the reciprocating head 32 has a back-up member 66 provided with an opening means 67 therein which permits the anvil member 34 to have the end 68 thereof moved downwardly in the manner illustrated in FIG. 9 so that the anvil member 34 does not provide any function during the first upward stroke of the head 32.

After the lancing operation, the terminal member 22 and switch blade 24 remain about the end 61 of the punch 31 in the manner illustrated in FIG. 10 as the head 32 is moved downwardly. However, the stripper member 64 could be actuated at the same time the head 32 begins to move downwardly from the condition illustrated in FIG. 9 to strip the lanced parts 22 and 24 therewith so that the parts 22 and 24 will move downwardly with the head 32 as desired.

In any event, once the head 32 moves downwardly, the compression spring 65 again moves the anvil member 34 upwardly so that the upper end 69 thereof is disposed flush with the upper surface 70 of the female die member 33 in the manner illustrated in FIG. 10. At this time, the member 66 is actuated so that a cam portion or stop means 71 thereof is disposed against the end 68 of the anvil 34 to prevent the same from moving downwardly from the position illustrated in FIG. 10.

Figure 11:
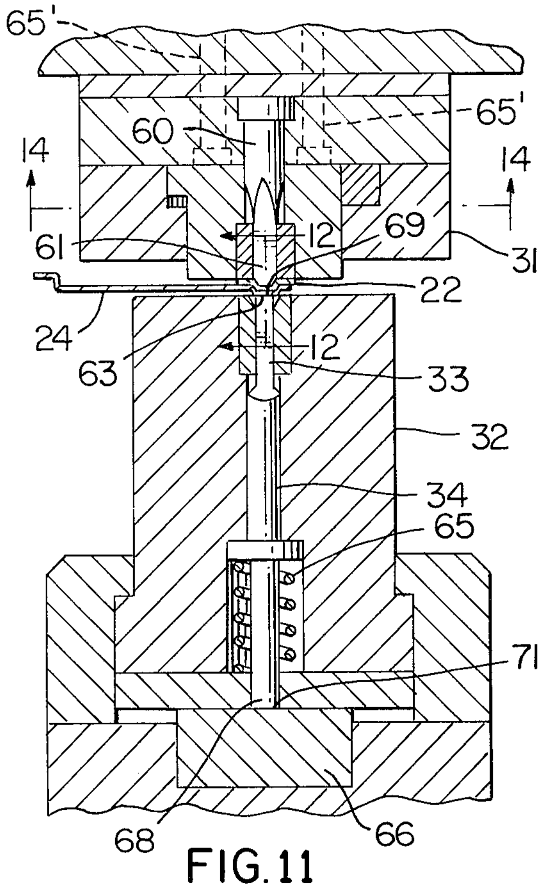
FIG. 11 is a view similar to FIG. 9 and illustrates the lancing and staking apparatus performing its staking operation.

On the second upward stroke of the head 32 from the position illustrated in FIG. 10 to the position illustrated in FIG. 11, it can be seen that the end 69 of the anvil 34 compacts against the lanced part 63 of the switch blade 24 to compact the lanced part 62 of the terminal member 22 between the end 61 of the stationary punch 60 and the anvil 34 to cause the terminal part 62 to be compressed outwardly and thereby be staked against the side 35 of the switch blade 24 to stake the same together as illustrated in FIG. 12 and as claimed in the aforementioned U.S. Pat. No. 4,059,897 to Marquis.

Thereafter, the head 32 is retracted in the manner illustrated in FIG. 13 and the stripper 64 is operated to move downwardly to strip the lanced and staked parts 22 and 24 from the end 61 of the punch 60 if the same had not already been stripped therefrom after the lancing step of FIG. 3.

In any event, once the members 22 and 24 have been lanced and staked together in the manner illustrated in FIG. 13, the same are indexed away from the station 56 toward the forming unit 58 so that a new switch blade 24 and new terminal member 22 will be positioned on the surface 36 of the head 32 in the manner illustrated in FIG. 8 to be subsequently lanced and staked together in the manner previously described.

Therefore, it can be seen that the lancing and staking apparatus 54 of this invention is of the same type as set forth in the aforementioned U.S. Pat. No. 4,035,901, to Lux et al, except that the apparatus has been inverted so that each switch blade 24 is placed on the upper surface 36 of the reciproacting head 32 and each terminal 22 is placed on the top of its respective switch blade 24 by the feeding means 57 whereby the apparatus 20 is adapted to substantially automatically continuously form the switch blade assemblies 21 of FIG. 2 in the manner previously described.

Therefore, it can be seen that this invention not only provides an improved apparatus and method for automatically forming switch blade assemblies, but also this invention provides an improved lancing and staking apparatus and method whether or not the same are making switch blade assemblies or other structures as desired.

While the forms and methods of this invention now preferred have been illustrated and described as required by the Patent Statute, it is to be understood that other forms and method steps can be utilized and still fall within the scope of the appended claims.

What is claimed is:

1. In a method of making an apparatus for joining two abutting metal members together by lancing and forming a part of one member through an unblanked part of the other member and thereafter staking said lanced and formed part of said one member to an adjacent surface of said other member to secure said members together in abutting relation with an apparatus that has a single reciprocating head having a first means that performs said lancing and forming step on a first stroke thereof and having a second means that performs said staking step on a second stroke thereof, the improvement comprising the steps of disposing said head to reciprocate substantially vertically beneath said abutting metal members, forming said first means of said head with a female die member, providing said apparatus with a punch toward which said head is moved during said first stroke thereof to lance and form said metal members between said female die and said punch, forming said second means of said head with an anvil member adapted to reciprocate in said female die member whereby said anvil member is adapted to compact said lanced and formed parts of said metal members between said anvil member and said punch during said second stroke of said head to perform said staking step, said one member comprising an electrical terminal and said other member comprising a switch blade whereby said secured together members comprise a switch blade assembly, said switch blade being substantially L-shaped and thereby having two legs disposed substantially at a right angle relative to each other with said terminal member to be secured to one of said legs, forming said head with a top means for receiving said one leg of each switch blade thereon and with a side means against which the other of said legs of the respective switch blade can be disposed, and holding said other leg of said respective switch blade against said side means of said head with an arm means.

2. A method as set forth in claim 1 and including the step of forming said head with stop means for holding said anvil member in a fixed position relative to said head during said second stroke thereof.

3. A method as set forth in claim 2 and including the step of forming said head with biasing means for tending to hold said anvil member in said fixed position thereof but permitting said anvil member to be moved inwardly in said female die member during said first stroke of said head to permit said lancing and forming step.

4. A method as set forth in claim 1 and including the step of forming said punch with a stripping means to strip said staked members from said punch after said second stroke of said head.

5. A method as set forth in claim 1 and including the steps of forming said apparatus with a frame, and causing said frame to movably carry said head to permit said head to move in substantially a straight line during said strokes thereof.

6. A method as set forth in claim 5 and including the step of providing said frame with a piston and cylinder device that is operatively interconnected to said head to cause said strokes thereof.

7. A method as set forth in claim 6 and including the steps of providing said frame with a pair of links, pivotally interconnecting said links together at adjacent ends thereof, pivoting the other end of one link to said frame, pivoting the other end of the other link to said head, and pivotally interconnecting said piston and cylinder device to said adjacent ends of said links to cause movement of said head through movement of said links.

8. A method as set forth in claim 1 and including the step of forming said head with locating means for orienting said one leg of said respective switch blade thereon.

9. A method as set forth in claim 8 and including the step of disposing said locating means on said side means of said head.

10. A method as set forth in claim 8 and including the step of forming locating means on said top means of said head for orienting a terminal on top of said one leg of said oriented and respective switch blade.

11. In an apparatus for joining two abutting metal members together by lancing and forming a part of one member through an unblanked part of the other member and thereafter staking said lanced and formed part of said one member to an adjacent surface of said other member to secure said members together in abutting relation, said apparatus having a single reciprocating head having a first means that performs said lancing and forming step on a first stroke thereof and having a second means that performs said staking step on a second stroke thereof, the improvement wherein said head reciprocates substantially vertically beneath said abutting metal members, said first means of said head comprising a female die member, said apparatus having a punch toward which said head is moved during said first stroke thereof to lance and form said metal members between said female die and said punch, said second means of said head comprising an anvil member adapted to reciprocate in said female die member, said anvil member being adapted to compact said lanced and formed parts of said metal members between said anvil member and said punch during said second stroke of said head to perform said staking step, said one member comprising an electrical terminal and said other member comprises a switch blade whereby said secured together members comprise a switch blade assembly, said switch blade being substantially L-shaped and thereby having two legs disposed substantially at a right angle relative to each other with said terminal member to be secured to one of said legs, said head having top means for receiving said one leg of each switch blade thereon and having a side means against which the other of said legs of the respective switch blade can be disposed, said apparatus having arm means for holding said other leg of said respective switch blade against said side means of said head.

12. An apparatus as set forth in claim 11 wherein said head has stop means for holding said anvil member in a fixed position relative to said head during said second stroke thereof.

13. An apparatus as set forth in claim 12 wherein said head has biasing means for tending to hold said anvil member in said fixed position thereof but permitting said anvil member to be moved inwardly in said female die member during said first stroke of said head to permit said lancing and forming step.

14. An apparatus as set forth in claim 11 wherein said punch has a stripping means operatively associated therewith, said apparatus having means for causing said stripping means to strip said staked members from said punch after said second stroke of said head.

15. An apparatus as set forth in claim 11 wherein said apparatus has a frame, said frame having means movably carrying said head to permit said head to move in substantially a straight line during said strokes thereof.

16. An apparatus as set forth in claim 15 wherein said frame carries a pistion and cylinder device that is operatively interconnected to said head to cause said strokes thereof.

17. An apparatus as set forth in claim 16 wherein said frame carries a pair of links being pivotally interconnected together at adjacent ends thereof, one link having the other end thereof pivoted to said frame, the other link having the other end thereof pivoted to said frame, the other link having the other end pivoted to said head, said piston and cylinder device being pivotally interconnected to said adjacent ends of said links to cause movement of said head through movement of said links.

18. An apparatus as set forth in claim 16 wherein said head has locating means for orienting said one leg of said respective switch blade thereon.

19. An apparatus as set forth in claim 18 wherein said locating means are disposed on said side means of said head.

20. An apparatus as set forth in claim 18 wherein said top means of said head has locating means for orienting a terminal on top of said one leg of said oriented and respective switch blade.

* * * * *